United States Patent [19]
Gondek

[11] Patent Number: 6,137,495
[45] Date of Patent: *Oct. 24, 2000

[54] METHOD FOR STORING, ACCESSING, TRANSFORMING, AND DISPLAYING MULTI-VARIABLE DIGITAL DATA

[75] Inventor: Jay S. Gondek, Camas, Wash.

[73] Assignee: Hewlett-Packard Company, Palo Alto, Calif.

[*] Notice: This patent is subject to a terminal disclaimer.

[21] Appl. No.: 08/984,281

[22] Filed: Dec. 3, 1997

Related U.S. Application Data

[63] Continuation of application No. 08/504,406, Jul. 20, 1997, Pat. No. 5,748,176.

[51] Int. Cl.$^7$ ................................................ G06T 11/40
[52] U.S. Cl. ...................... 345/431; 345/153; 345/155
[58] Field of Search ................................ 345/431, 153, 345/155

[56] References Cited

U.S. PATENT DOCUMENTS 5,149,960  9/1992  Dunne et al. ............................ 250/226

OTHER PUBLICATIONS

Using Computer Color Effectively: An Illustrated Reference, L.G.Thorell/W.J.Smith, Hewelett Packard, Prentice Hall, ISBN: 0–13–939878–3, 1990.

*Primary Examiner*—Mark Zimmerman
*Assistant Examiner*—Mano Padmanabhan

[57] ABSTRACT

A method of data storage, access, interpolation, and display, particularly suited to colorimetry, is disclosed. From a relatively small, multidimensional, device-independent, data base—or "color map"—a subdivision routine is employed to achieve an interpolative data base of relatively immense size. For example, color data input for an image from an RGB monitor is converted to a correlated CMYK printer output. The routine is commercially fast and economical. The iterative process can be selectively controlled to achieve a variety of levels of interpolation and to emulate true interpolation algorithms such as trilinear and quadrilinear interpolation formulas without requiring sophisticated and expensive hardware.

9 Claims, 5 Drawing Sheets

METHOD FOR STORING, ACCESSING, TRANSFORMING, AND DISPLAYING MULTI-VARIABLE DIGITAL DATA

CROSS-REFERENCE TO RELATED APPLICATIONS

This is a continuation of U.S. Ser. No. 08/504,406, filed Jul. 20, 1997 now U.S. Pat. No. 5,748,176.

FIELD OF THE INVENTION

The present invention relates generally to data processing technology and, more specifically, to a data storage and interpolation method useful when converting from one spatial construct to another, such as from one color display system to another, particularly suited to color data transformations for hard copy machines.

BACKGROUND OF THE INVENTION

Colorimetry has long been recognized as a complex science. Essentially, as defined in 1931 by the Commission Internationale L'Eclairage (CIE), three primary colors (X, Y, Z) can be combined to define all light sensations we experience with our eyes; that is, the color matching properties of an ideal trichromatic observer defined by specifying three independent functions of wavelength that are identified with the ideal observer's color matching functions form an international standard for specifying color. In general, it has been found possible and convenient to represent color stimuli vectors by a three-dimensional spatial construct, called a tristimulus space or a color space. The fundamentals of such three-dimensional constructs are discussed in the literature, such as *Principles of Color Technology*, by Billmeyer and Saltzman, published by John Wiley & Sons, Inc., NY, copyright 1981 (2d. ed.) and *Color Science: Concepts and Methods, Quantitative Data and Formulae*, by Wyszecki and Stiles, published by John Wiley & Sons, Inc., copyright 1982 (2d ed.), incorporated herein by reference in pertinent parts, particularly pages 119–130.

A variety of trichromatic model systems—such as the red, green, blue (RGB) model; the cyan, magenta, yellow (and black) (CMY(K)) model; the hue, saturation, value (HSV) model; the hue, lightness, saturation (HLS) model; the luminance, red-yellow scale, green-blue scale (L*a*b*) model; the YIQ model used in commercial color television broadcasting; and others—provide alternatives for the system designer. Such works as *Fundamentals of Interactive Computer Graphics*, by Foley and Van Dam, Addison-Wesley Publishing Company, incorporated herein by reference in pertinent parts, particularly pages 606–621, describe a variety of tri-variable color models.

Color input and output devices—such a scanners, cathode ray tube (CRT) video monitors, and printers—present color images in a device-dependent fashion. For example, CRT guns are driven by RGB values (voltage levels or other input signal functions, referred to hereinafter as data triplets) that are stored in a frame buffer. Those RGB values index over the color space of each particular model video monitor; in other words, the color produced by a CRT on a pixel of its screen for a given RGB triplet of values is unique to that device. Because of device design dependency, the same RGB triplet may produce a very different color or hue when displayed on a different model CRT and still a different color in a hard copy made with a color printer.

Color transformation (also referred to in the art as color correction and cross-rendering) between model systems in digital data processing presents many problems to the original equipment manufacturer. The transformation of data from one device to another device is difficult because the color matching relationship between those systems are generally non-linear. Therefore, a crucial problem is the maintaining of color integrity between an original image from an input device (such as a color scanner, CRT monitor, digital camera, computer software/firmware generation, and the like) and a translated copy at an output device (such as a CRT monitor, color laser printer, color ink-jet printer, and the like).

As discussed in the reference materials cited above, colors can be constructed as renderings of the additive primary colors, red, green, and blue (RGB), or of the subtractive primary colors, cyan, magenta, yellow and black (CMYK). A transformation may require going from an RGB color space, for example, a computer video monitor, to a CMYK color space, for example, a laser printer hard copy. A transformation from one color space to another requires complex, non-linear computations in multiple dimensions. Since such is not describable mathematically, the use of very large look-up tables, e.g. 50 megabytes, containing data to approximate a transformation is generally required to go from an RGB system to a CMYK system to correlate a wide spectrum of color hues. [Note: To maintain black color purity in CMYK printing, a separate black ink or toner is usually provided rather than printing all three cyan, magenta and yellow colors as a composite black; the use of such a separate black rendition mechanism is assumed for the purpose of disclosing the present invention.] A lookup table of input versus output data can be generated for any set of devices. There are a variety of methods for building a device-dependent look-up table for a particular device. U.S. Pat. No. 3,893,166 (Pugsley) provides an example. However, semiconductor memory is relatively expensive and other data storage technologies for maintaining such tables—disks, tape, and the like—are too slow.

Therefore, there is a need for a process that transforms the color values from one particular device color space into the color space of another device in a fast, economical manner.

Figure 1:
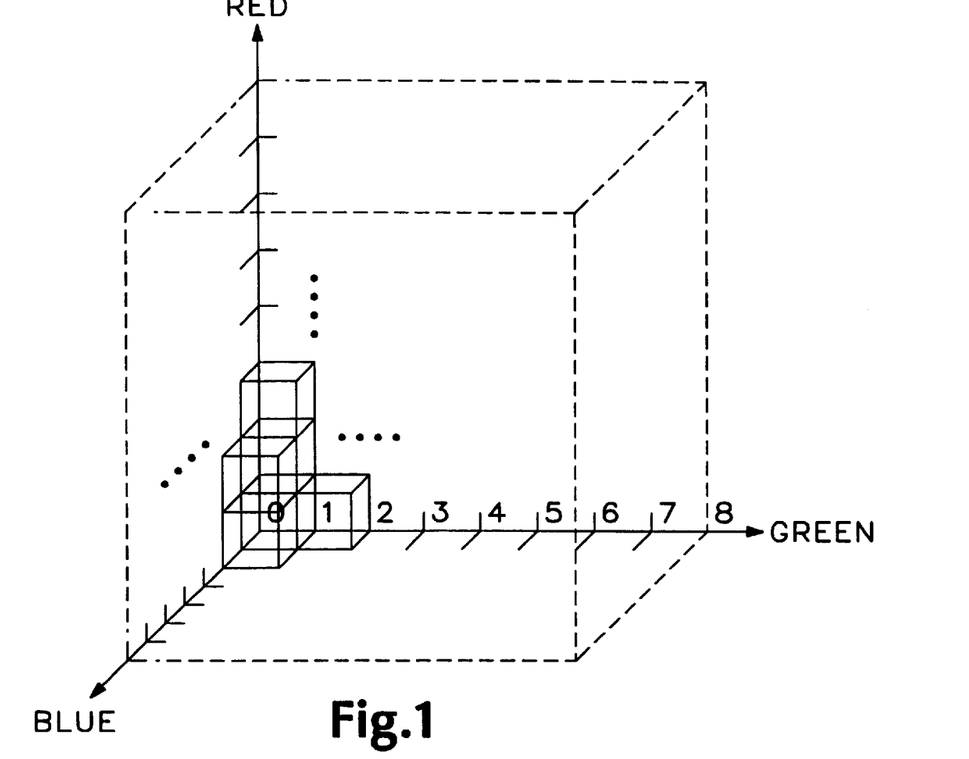
FIG. 1 is a spatial representation of a generic lattice memory organization construct in accordance with the present invention.

Bytes of data correlated in three dimensions can be represented as a cubic lattice construct with each corner of a cube representing a data point. The total look-up table is made of many such cubes as shown in FIG. 1 for an RGB, or other model, color space construct. However, to store a typical printer color transformation data point value for every monitor RGB value in a look-up table would require about fifty megabyte of memory which is cost prohibitive in the state-of-the-art. Thus, it is economic to store only a limited number of data points and to use interpolation methods to derive intermediate data points within the lattice.

Transforming CRT video monitor RGB triplets into printer RGB (or CMY, or CMYK) values can be accomplished by utilizing color measurement tools and device-color spaces. Device-independent color provides accurate color matching based on an absolute color standard, such as the CIE. A device-independent color space provides a way for describing the appearance of a color without referring to the mechanism that produced the color. For example:

first, a function is constructed that transforms RGB data points from the color space of a monitor (that is, the table of input-output correlations) into a device-independent color space, e.g., the CIE L*a*b* color space;

second, a function is constructed that transforms color data points from the device-independent color space, the CIE L*a*b* color space, into the color space of a particular printer; and using these two functions, the monitor RGB data values can be transformed to L*a*b* data triplets and the L*a*b* data triplets transformed into the printer data triplets, thus providing printer output that matches the original output as viewed on the CRT monitor.

However, in addition to the data storage and access problems referred to above, the mapping of the monitor RGB values into printer RGB values is time intensive to perform on each and every colored pixel in an image before completely printing that image. Therefore, it is economic to pre-compute and store the printer output RGB values for a subset of monitor input RGB values and then to use a fast interpolation algorithm to approximate the transform function for intermediate RGB values, namely those that have not been pre-computed and stored.

In making the transform from one tristimulus system to another, trilinear or quadrilinear interpolation methods as would be known to a person skilled in the art have been used. One purported device for an algorithmic interpolation solution using the L*a*b* model is described briefly in Electronic Engineering Times, Nov. 9, 1992, page 35, *High-speed processor transforms colors*, by Junko Yoshida. However, Yoshida's "new algorithm" itself is not disclosed. A commonality of such interpolator solutions is that they must access data for the three or more variables simultaneously, namely, in parallel, in order to obtain the fastest speed, requiring either redundant data tables or complex storage access mechanisms. Moreover, such interpolation methods require multiplication and division mathematical operations which require complex and expensive hardware.

There is a need for a fast and economical method for storing limited points of an output data table and interpolating the stored data to obtain a proper transform between multi-variable data processing systems.

SUMMARY OF THE INVENTION

In its basic aspect, the present invention is a multi-variable data storage, access, interpolation, and transmission method for a continuum of data points using a n-dimensional space data construct. The method includes: providing a data base having a predetermined number of the data points such that each data point stored in the memory is accessible by referencing n-coordinates, one in each axial direction of the n-dimensional space data construct; receiving a first predetermined code for extracting contiguous data points in each of the axial directions such that the desired output data point lies within a n-dimensional spatial construct between the contiguous data points; receiving a second predetermined code for subdividing the n-dimensional spatial construct into n-dimensional spatial subconstructs a predetermined number of times such that each consecutive subconstruct converges on contiguous data points within a previously spatial subconstruct; and transmitting a data point within a predetermined one of said spatial subconstructs as the desired output data.

It is an advantage of the present invention in that it requires only simple binary operations to execute a data interpolation.

It is another advantage of the present invention that it can be implemented efficiently with simple, inexpensive microprocessors, making integrated circuit implementation cost effective.

It is yet another advantage of the present invention that it permits a selective throughput speed for accuracy trade-off on a per image basis.

It is a further advantage of the present invention that it can be used to simulate a number of different interpolation methods.

It is an advantage of the present invention that it provides a reduction in multi-variable data interpolation computation time requirements over a standard trilinear interpolation.

It is yet another advantage of the present invention that it provides a method and apparatus for color data interpolation that is sensitive to cost and data processing speed.

Other objects, features and advantages of the present invention will become apparent upon consideration of the following detailed description and the accompanying drawings, in which like reference designations represent like features throughout the FIGURES.

DESCRIPTION OF THE DRAWINGS

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable. While the invention is described in terms of transforming a first exemplary RGB space (CRT monitor) to a second exemplary RGB space (printer), it is not intend as a limitation on the scope of the invention. The general method and apparatus disclosed herein is expandable for interpolation of any type of non-linear data that can be represented as a multidimensional construct.

As mentioned above, a solution to the color space transformation problem is to pre-compute the printer output RGB values for a subset of monitor input RGB values and then to use a fast interpolation algorithm to approximate the transform function for intermediate RGB values, that is, those that have not been pre-computed and stored. The present invention uses a data storage and numerical subdivision technique not requiring complex multiplier and divider circuitry to provide a fast and accurate method for interpolating the pre-computed color transform function.

FIG. 1 represents a continuum of color data formulated as a lattice construct for color data in which three axes, X-axis for Green, Y-axis for Red, and Z-axis for Blue, define the data points in a tristimulus space. Each corner of each cube in the lattice represents a stored data point. It is common practice to use eight bit (one byte) digital data values. Therefore, in the implementation of the present invention, an exemplary CRT monitor to printer RGB transform, data points are pre-computed for 729 [$(2^3+1)^3$] RGB values, equally spaced over the color space of the monitor; that is, data across the spectrum is stored in nine equal steps—0 to 8—in each of the CRT Red, Green and Blue axes. Note that the methodology of the present invention works for any ($2^m+1$) data set, where
($2^m+1$) is the density of data points stored, that is, the number of samples per dimension in the specific implementation, and
"n" is the number of variables in the first data construct.

In the exemplary case of a tristimulus color space, a tri-variable data set, n=3. In this implementation m=3, which gives nine data gradations per dimensional axis. Thus, a total of 729 data points.

These data points form the three dimensional lattice as shown in FIG. 1. Generally, the data base of this construct comprises a predetermined number of output data values for driving output devices (such as an ink-jet pen controller) correlated to given input data values for that specific output apparatus.

Figure 2:
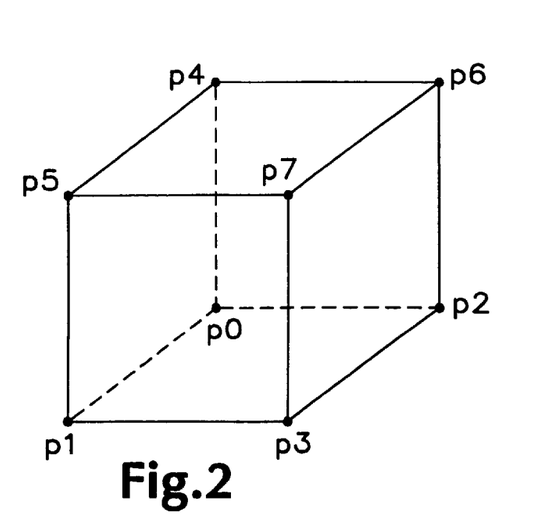
FIG. 2 is an extracted "data cube" from the lattice memory organization construct of data as shown in FIG. 1.

In FIG. 2, a cube is extracted from the lattice. In accordance with the present invention, a standard is established in which the lower left back (LLB) corner, p0, represents the minimum RGB values for that specific color space and the upper right front (URF) corner, p7, represents the maximum RGB values for that specific color space. In another annotation, it may be represented as:

$$p0 = R_{min}, G_{min}, B_{min} \text{ and } p7 = R_{max}, G_{max}, B_{max}.$$

Figure 6:
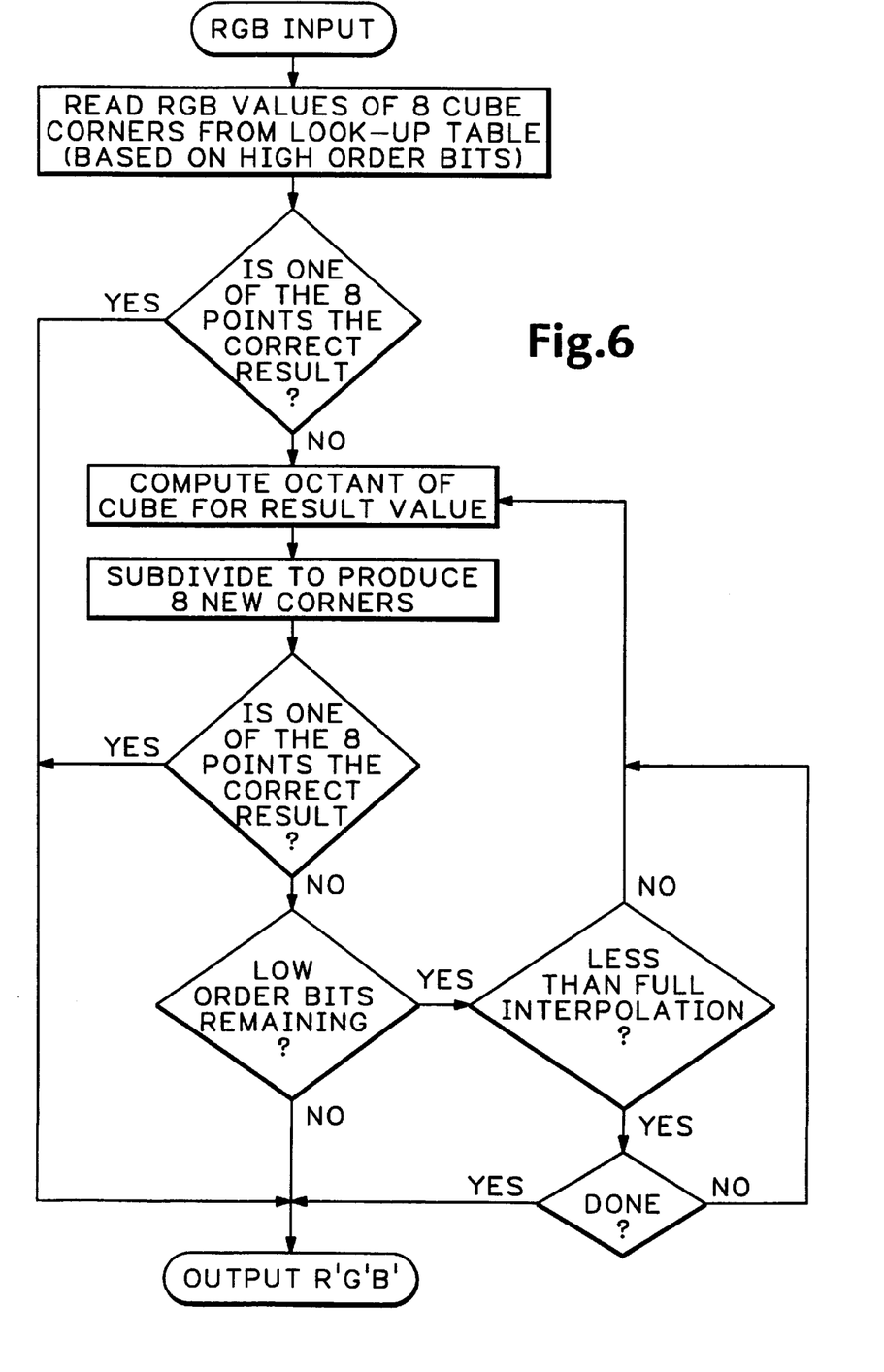
FIG. 6 is a flow chart of the method of the present invention.

For a pixel to be printed, an RGB input value is received (see also, FIG. 6, step 601). For any specific pixel to be printed by a device capable of generating millions of color variations, it is highly probable that the color to be printed lies within the boundaries of a cube of eight of the stored 729 RGB values; i.e., it is not one of the specific hues stored, but lies within one of those stored memory cubic constructs.

The upper three bits of each of the eight bit RGB values are used to index into the color map data construct lattice to extract the eight data points that surround the RGB value to be derived by interpolation (FIG. 6, step 603).

For example, assume the input values to the lattice are:

R=00101100(=44)

G=10100101(=165), and

B=01111011(=123). (1)

The upper three bits of each of these values are

R=001(=1)

G=101(=5)

B=011(=3), (2)

and used to obtain (or may be understood to be "indexed to") a particular cube of the entire lattice, namely the cube of FIG. 2, extracted from FIG. 1, in which LLB data point p0 would be "up" one from the origin on the Red axis, "left" five from the origin on the Green axis, and "out" three from the origin on the Blue axis. In essence, the upper three bits provide the "address" in the lattice to obtain eight data points that surround the desired value; the desired output RGB value is guaranteed to be contained within the cube described by these eight data points, p0 through p7. If the input is indexed is one of the stored data points that data point is output (FIG. 6, step 605).

Also, a rough approximation for a transform could be produced by using one of these eight points, or an average of these points—the "center" of the extracted cube—as the output value. This would produce a mapping that, in this example of 729 store values, provides 1241 possible output values—each corner plus each center. However, this approximation is still not adequate for most applications.

Repetitive subdivision—importantly requiring no complex mathematical computations and associated hardware—is used to provide a means for computing a more accurate result in accordance with the method of the present invention.

Figure 3:
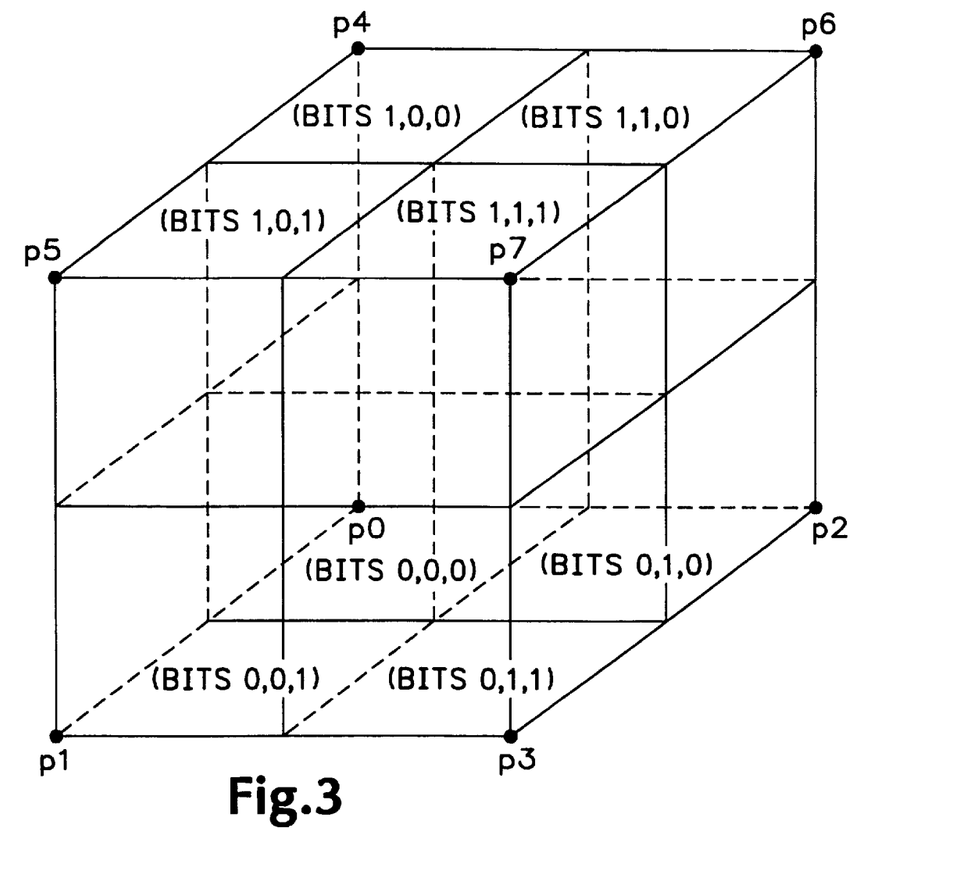
FIG. 3 is a depiction of a first subdivision into octant spatial regions of the extracted data cube as shown in FIG. 2.

Turning to FIG. 3, a mapping of bit triplets to octants subcubes of the original cube of FIG. 2 is demonstrated. In other words, the LLF octant subcube, bits 0,0,1, is displaced "0" in the Red axis, "0" in the Green axis, and "1" in the Blue axis. All eight octant subcube "addresses" are similarly derived (FIG. 6, step 607).

The five lower order bits of the RGB values given in (1) above are now used to control the subdivision of the cube formed by the eight data points extracted using the upper three bits in (2) in FIG. 2 to interpolate the sought after transformation color (FIG. 6, step 609). That is, the bits that guide the subdivision routine are:

R=01100

G=00101 and

B=11011. (3)

The highest order bit from each of the five bits of each color axis of each data triplet dictates the first subdivision:

R=0

G=0, and

B=1. (4)

Given these three bits, eight new data points are computed from the original data points by subdivision. These data points are, again for the purpose of this example, the corners of the LLF octant subcube, denoted:

$s0 = (p1-p0)/2$ $s1 = p1$ $s2 = (p3-p0)/2$ $s3 = (p3-p1)/2$ $s4 = (p5-p0)/2$ $s5 = (p5-p1)/2$ $s6 = (p7-p0)/2$ (=center of data cube of FIG. 3)

Figure 4:
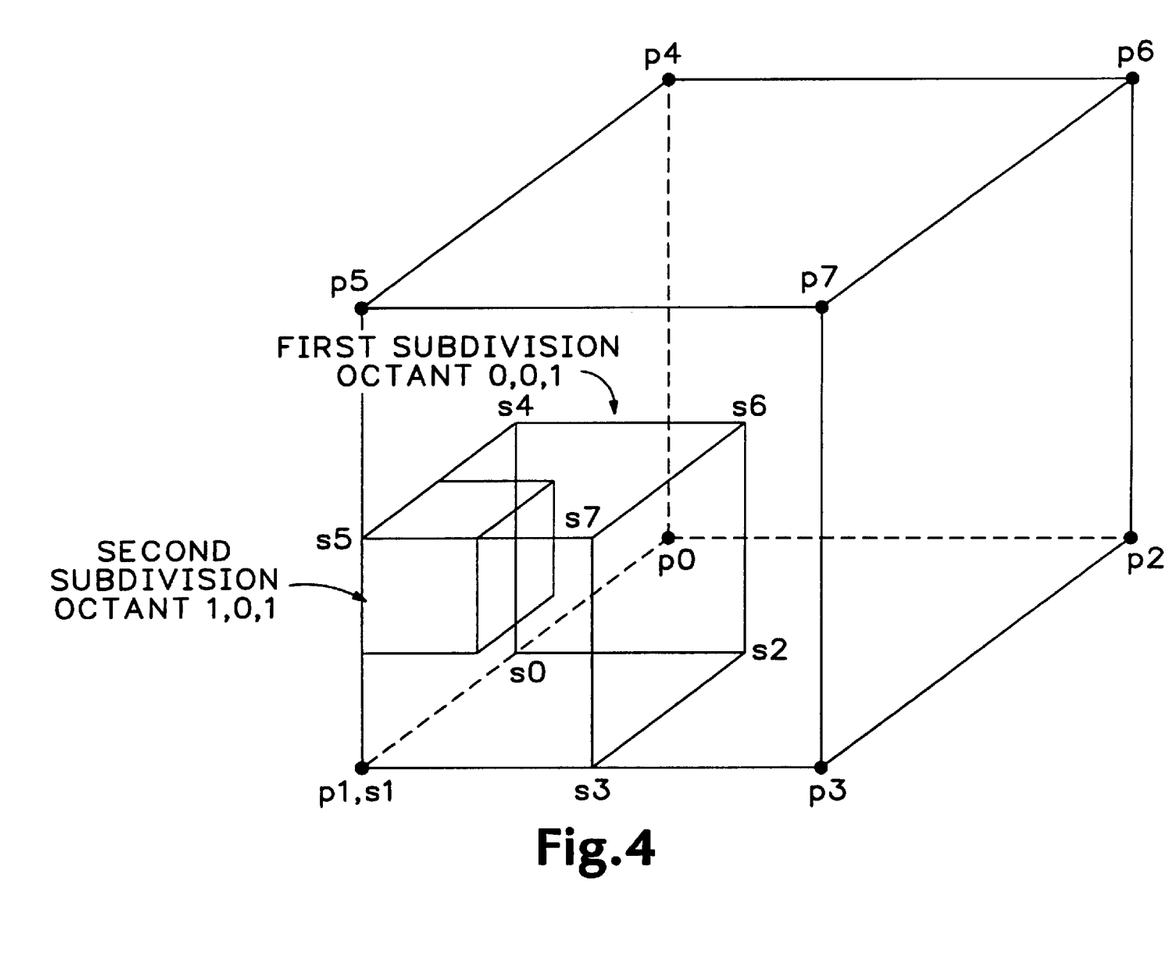
FIG. 4 is a depiction of a second subdivision of the spatial regions of the extracted data cube as shown in FIG. 3.

$s7 = (p7-p1)/2$, (5)

as shown in FIG. 4.

Figure 5:
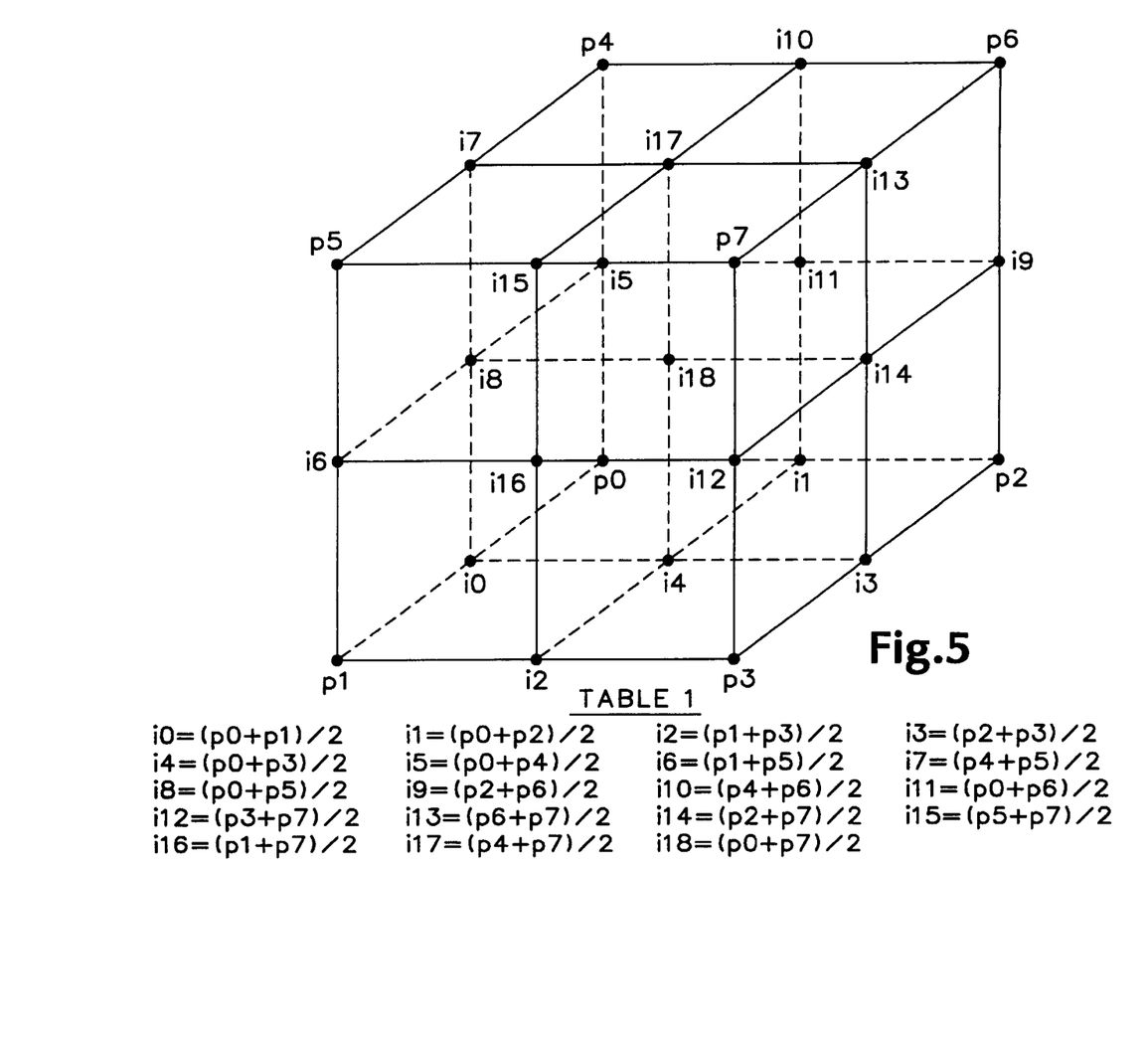
FIG. 5 is a depiction of intermediate data points used for the subdivision steps as shown in FIGS. 3 and 4.

The intermediate points between corners of a cube that are computed to allow subdivision may be computed many different ways, simulating a number of interpolation methods. For example, as shown in FIG. 5, data values for the intermediate points shown as i0 ... i18 can be computed to simulate tetrahedral interpolation as shown in accompanying TABLE 1. Such simple algorithms can be provided for trilinear or other interpolation method as would be known in the art as desired.

In practice, by using such simulations, division by 2 is simply a binary right shift, so expensive division operational hardware is not needed. Also, all of the intermediate points do not need to be computed with each subdivision; only seven points since one is always redundant (see s1 above) and only the data points of the next octant as determined to contain the data point of interest as determined from the next significant bits of the string used.

In effect, these eight new data points, s0 through s7, define an octant of the original cube and the desired output value is within the octant subcube. We have reached a level of accuracy where 4096 output values are mapped to the input values if the "center" or average value of the eight new data points is provided as the transform result. More accurate interpolation requires further subdivision.

For a second subdivision, the second bit from each of the five bit strings shown in (3) above are used:

$$R=1$$
$$G=0,$$

and $$B=1. \quad (6)$$

As shown again in FIG. 4, in the same manner that the original cube p0–p7 was subdivided, this results in a second subdivision octant cube of the first subdivision octant subcube s0–s7. Again, the sought after output data point is in a cube where the desired output RGB output color value is contained. As the eight newly derived data points are relatively closer in value, the new cube in which the data point is guaranteed to be contained is yet a closer interpolation of the desired output value than was the first subcube, points s0 through s7.

The process is continued with the third bit, then the fourth bit, then the fifth bit, resulting in three more subdivisions (five total) from the eight bit string of the original RGB triplet (FIG. 6, step 611 et seq.). Thus, after five such subdivisions, an interpolated set of 16,777,216 output values, each corresponding to an output RGB value has been mapped from the original 729 stored value set. Either one of the "smallest" (fifth subdivision) subcube corner values or some average of these eight converged data points is returned as the correct output, R'G'B' (FIG. 6, step 613) for the given input function.

Thus, there is provided a fast and commercially economical means for color data transformation to meet the needs of interfacing devices that are otherwise running device-dependent and incompatible data processing hardware. The returned output interpolated from the simple lattice will generally be indistinguishable to the naked eye from the input source color; e.g., the color on the video monitor will be reproduced on the hard copy.

Note also, the method of the present invention allows a trade of speed for accuracy on a per-image basis. Fewer subdivisions require less data processing time. For example, selecting to use fewer subdivisions provide a valid, although less accurate, color space mapping, but may be perfectly adequate for a business graphic, such as a simple bar chart. A computer artist, less interested in speed than reproduction quality would use all five subdivision iterations. This feature also could be utilized in real-time and time-critical applications adaptively to convert large images with less accuracy than small images. Fast image preview and draft image printing can be made faster by sacrificing some accuracy.

Furthermore, the level of subdivision can also vary within a particular set of color data. More subdivision can be provided in the parts of the color map where high accuracy is needed and less where it is not. For example, there are subtle color changes at the near-neutral axis more than in very saturated colors; therefore, saturated color areas do not need to be computed as accurately. This would provided optimal solutions to the accuracy versus throughput trade. To implement this, one would pre-compute the level of subdivision needed in each "cube" of the color map based on perceptual metrics and store that value along with the color data. During the real-time execution, the level of subdivision would be guided with this data.

The steps of the methodology are repeated in FIG. 6. The routine can be utilized implemented in either software and firmware implementations.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. While the method has been explained with respect to an exemplary embodiment of and 9×9×9 construct, it will be recognized by a person skilled in the art that the methodology is applicable to extensions such as 5×5×5, 17×17×17, etc., multivariable data constructs.

For example:

| lookup bits | interpolation bits | table size |
| --- | --- | --- |
| 0 | 8 | 2 × 2 × 2 |
| 1 | 7 | 3 × 3 × 3 |
| 2 | 6 | 5 × 5 × 5 |
| 3 | 5 | 9 × 9 × 9 |
| 4 | 4 | 17 × 17 × 17 |
| 5 | 3 | 33 × 33 × 33 |
| . | . | . |
| . | . | . |
| . | . | . |

Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method for storing, accessing, transforming, and diplaying multi-variable digital data by interpolating input data from a multi-variable first data construct to a multi-variable second data construct, wherein each data point in each said construct is represented by predetermined strings of data bits, the method comprising the steps of:

storing $(2^m+1)^n$ color space data points, where $(2^m+1)$ is density of data points stored and "n" represents number of variables in said first data construct, from a continuum of color space data points of said second construct correlated to a first color space data system such that first predetermined bits of "n" string of color space data bits in said first data consruct addresses $2^n$ contiguous color space data points in said second data construct and second predetermined bits of said string of color space data bits in said first data construct represent a code for interpolating color space data points between said $2^n$ contiguous color space data points;

receiving a set of "n" strings of input data of said first data construct;

accessing a set of $2^n$ strings of color space data of said second data construct based upon said predetermined bits in each of said first data construct "n" strings of input data;

subdividing said set of $2^n$ strings of color space data using a first subset of said code and interpolating color space data points such that a first subset of $2^n$ color space data points converging with said set of contiguous data points is obtained;

repeating said step of subdividing using a subsequent subset of said code for interpolating said subset of $2^n$ color space data points to obtain a second subset of said first subset of $2^n$ color data points for each subsequent subset of said code in said second predetermined bits of said string of data bits in said first data construct;

transmitting a data point with a predetermined one of said subsets as an interpolated input data point as a corresponding output data point; and displaying said output data point.

2. The method as set forth in claim 1, following said step of accessing, the method comprising the further steps of:

determining if one of said $2^n$ strings of data is to be output, and if so, displaying said data output; and repeating said method for a next set of "n" strings of data of said first data construct.

3. The method as set forth in claim 1, following said step of repeating, comprising the further steps of:

determining a number of subdivisions of said second data construct to be performed, and terminating said step of repeating when said number of subdivisions has been reached.

4. The method as set forth in claim 1, following said step of repeating, comprising the further steps of:

terminating said step of repeating when one of said strings of data is a desired data point, displaying said desired data output point, and repeating said method for a next set of "n" strings of data of said firs data construct.

5. A method for interpolating tristimulus space color data of a digital color data map, comprising the steps of:

storing a color data map of a predetermined number of equal interval, tristimulus space, digital color data output values in a memory representing a three-dimensional cubic construct;

providing three eight-bit digital data words representing three tristimulus space, digital color data input values;

using said three eight-bit digital data words to interpolate said color data map including the steps of A) using three predetermined bits of each of said eight-bit digital data words to access a first set of eight color data values forming a cubic construct in said memory, B) using one predetermined bit of each of said eight-bit digital data words to access a second set of eight color data values forming a first cubic subconstruct within said cubic construct, C) iteratively repeating step B) a predetermined number of times using another one predetermined bit of each of said eight-bit digital data words each iteration to access converging sets of eight data values from a previously accessed subconstruct; and transmitting a data value from a last subconstruct obtained in step C) as interpolated digital data color input values.

6. The method as set forth in claim 5, further comprising the steps of:

following step A), determining if any of said first set of eight data values is said data value from said map to be extracted, if any of said first set of eight data values is said data value from said map to be extracted, transmitting said data value, and returning to said step of providing.

7. The method as set forth in claim 5, further comprising the steps of:

following said step of using one predetermined bit, determining if any of said second set of eight data values is said data value from said color map to be extracted, if any of said second set of eight data values is said data value from said map to be extracted, transmitting said data value, and returning to said step of providing.

8. The method as set forth in claim 5, further comprising the steps of:

determining if any of said subconstructs includes a data value from said map to be extracted, if any of said subconstruct data values is said data value from said color map to be extracted, transmitting said data value, and returning to said step of providing.

9. The method as set forth in claim 5, said step of repeating further comprising the steps of:

setting a limit of a predetermined number of repetitions of said step of using one predetermined bit.

* * * * *